US 11,213,864 B2

(12) United States Patent
Boyd et al.

(10) Patent No.: US 11,213,864 B2
(45) Date of Patent: *Jan. 4, 2022

(54) PRESSURE WASHING SYSTEM AND METHOD

(71) Applicants: Clayton Boyd, Rotonda West, FL (US); Jennifer Boyd, Rotonda West, FL (US)

(72) Inventors: Clayton Boyd, Rotonda West, FL (US); Jennifer Boyd, Rotonda West, FL (US)

(73) Assignee: Boyd Equipment & Supply LLC, Punta Gorda, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,328

(22) Filed: May 11, 2020

(65) Prior Publication Data

US 2020/0269288 A1 Aug. 27, 2020

Related U.S. Application Data

(63) Continuation of application No. 15/992,155, filed on May 29, 2018, now Pat. No. 10,646,900, which is a continuation of application No. 14/685,355, filed on Apr. 13, 2015, now abandoned.

(51) Int. Cl.

| | |
|---|---|
| *B08B 3/02* | (2006.01) |
| *A47L 11/40* | (2006.01) |
| *B62B 3/00* | (2006.01) |
| *B05B 12/34* | (2018.01) |
| *B05B 13/00* | (2006.01) |

(Continued)

(52) U.S. Cl.
CPC .......... *B08B 3/024* (2013.01); *A47L 11/4072* (2013.01); *A47L 11/4075* (2013.01); *A47L 11/4088* (2013.01); *B62B 3/00* (2013.01); *B05B 3/06* (2013.01); *B05B 12/34* (2018.02); *B05B 13/005* (2013.01); *B62B 5/067* (2013.01); *B62B 2301/044* (2013.01); *B62B 2301/05* (2013.01)

(58) Field of Classification Search
CPC ..... B08B 3/024; A47L 11/4088; B05B 12/34; B62B 2301/044
See application file for complete search history.

(56) References Cited

U.S. PATENT DOCUMENTS

| | | | | |
|---|---|---|---|---|
| 2009/0223541 | A1* | 9/2009 | Gardner | .................. B08B 3/024 134/174 |
| 2010/0282866 | A1* | 11/2010 | Gilpatrick | ................. B05B 1/34 239/310 |
| 2011/0030724 | A1* | 2/2011 | Alexander | .............. B08B 3/026 134/6 |

* cited by examiner

*Primary Examiner* — Natasha N Campbell
(74) *Attorney, Agent, or Firm* — Lawrence E. Thompson; The Thompson Law Office, P.C.

(57) ABSTRACT

Disclosed herein are various embodiments of a system and method for operating a surface pressure washer with a wand component. The method may include the steps of cleaning a first surface through a first fluid path, where the first fluid path includes a pump, a pressure regulating valve, a diversion block, and a spray gun, while spray nozzles are not discharging fluid to a second surface, actuating a valve connected to the diversion block, thereby reducing the pressure available to the first fluid path and creating a second fluid path, where the second fluid path includes the pump, the pressure regulating valve, the diversion block and the spray nozzles, where the spray nozzles are configured to rotate above the second surface when the second fluid path is open, and cleaning a second surface underneath the pressure washer system through the second fluid path.

3 Claims, 10 Drawing Sheets

(51) Int. Cl.
*B05B 3/06* (2006.01)
*B62B 5/06* (2006.01)

PRESSURE WASHING SYSTEM AND METHOD

BACKGROUND

Field

This invention is generally related to pressure washer systems and methods, and more particularly to a system and method for operating a surface pressure washer with a spray gun component.

Background

Pressure washing systems in the past have suffered from the lack of an efficient and cost effective system and method for preventing damage to surfaces underneath the system, when a spray gun component is used to clean a second surface that is not underneath the system. Therefore, there is a need for a new and improved system and method for operating a surface pressure washer with a spray gun component.

SUMMARY

Disclosed herein is a new and improved system and method for operating a pressure washer with a spray gun component. In accordance with one aspect of the approach, a pressure washer system may include a pump, a pressure regulating valve, a diversion block, where the pump provides a fluid to the diversion block, a spray gun, a first fluid path, where the first fluid path includes the pump, the pressure regulating valve, the diversion block, and the spray gun, a valve, a valve trigger, a trigger base that pivotally secures the valve trigger to position the valve trigger to actuate the valve when the valve trigger pivots about the trigger base, a rotary nozzle system, where the actuation of the valve creates a second fluid path, where the second fluid path includes the pump, the pressure regulating valve, the diversion block, the valve and the rotary nozzle system, and wherein the rotary nozzle system includes one or more rotating spray nozzles when the second fluid path is open, wherein the second fluid path is blocked when the valve is not actuated.

In accordance with another aspect of the approach, a method of washing flat surfaces and surfaces adjacent to the flat surface may include the steps of cleaning a first surface that is not underneath a pressure washer pressure through a first fluid path, where the first fluid path includes a pump, a pressure regulating valve, a diversion block, and a spray gun, while spray nozzles are not discharging fluid to a second surface, actuating a valve connected to the diversion block, thereby reducing the pressure available to the first fluid path and creating a second fluid path, where the second fluid path includes the pump, the pressure regulating valve, the diversion block and the spray nozzles, where the spray nozzles are configured to rotate above the second surface when the second fluid path is open, and cleaning a second surface underneath the pressure washer system through the second fluid path.

Other systems, methods, aspects, features, embodiments and advantages of the system and method for operating a pressure washer with a wand component disclosed herein will be, or will become, apparent to one having ordinary skill in the art upon examination of the following drawings and detailed description. It is intended that all such additional systems, methods, aspects, features, embodiments and advantages be included within this description, and be within the scope of the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the system disclosed herein. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

Figure 1:
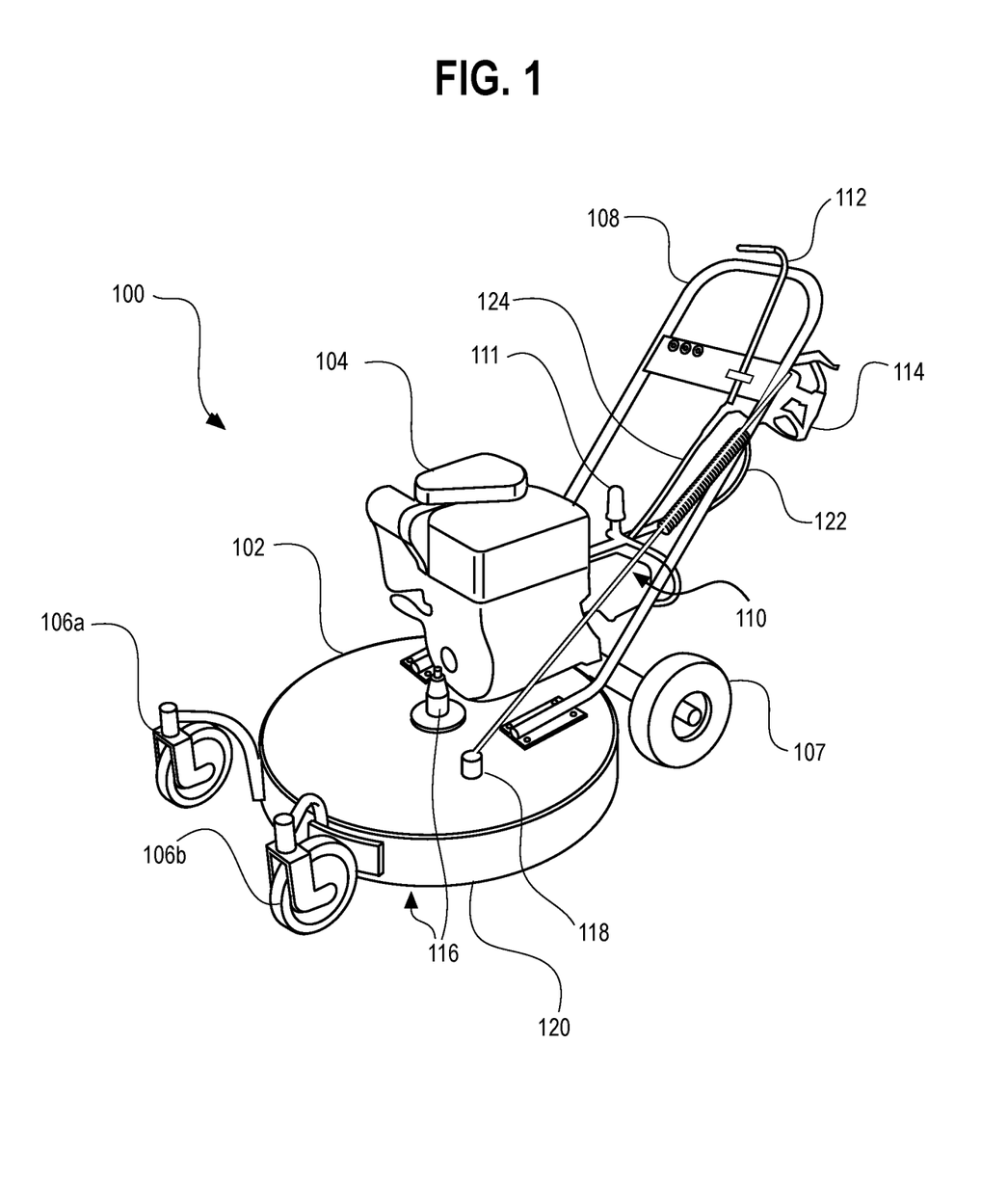
FIG. 1 is a view of a pressure washing apparatus, including a deck housing, a rotary nozzle system, right and left front wheel mechanisms, a rear wheel mechanism, a handle, and a diversion system.

FIG. 1 shows an exemplary pressure washing apparatus 100. The apparatus 100 may include a deck housing 102, a power source 104, a right front wheel mechanism 106a, a left front wheel mechanism 106b, a rear wheel mechanism 107, a handle 108, a pump 110, a pressure regulating valve 111, a diversion system 112, a spray gun 114, and a rotary nozzle system 116. The deck housing 102 partially covers, and may support, the rotary nozzle system 116. The deck housing may also include a gun terminal holder 118, and a splash guard 120. The pressure washing apparatus may also include fluid lines, such as, but not limited to, a PRV to diversion block fluid line 122, and a diversion block to rotary nozzle system fluid line 124.

Pressure washing apparatus 100 may be employed to wash a first flat surface (not shown) beneath the apparatus 100, and to quickly wash areas of a second surface (not shown) that may be adjacent to or located near the flat surface beneath the apparatus 100, such as corners and vertical surfaces. Pump 110 may provide, but is not limited to, 1000 PSI and a flow of 3.6 to 6 GPM. The diversion system 112 provides a means for diverting the flow and pressure from the spray gun 114 to the rotary nozzle system 116 only when needed to clean the flat surface beneath the apparatus 100. Thus, providing means for preventing over cleaning, and damage, to the first flat surface while the pressure washing apparatus 100 is employed to clean the second surface.

Deck housing 102 may be formed from materials such as, but not limited to spun aluminum, steel, and stamped metal. The housing 102 is generally, but is not limited to, a circular shape as shown in FIG. 1. Power source 104 may be, but is not limited to, a residential, commercial, and industrial grade engine the may use fuel, such as, but not limited to, gasoline, electricity, diesel propane, and compressed gas. Pump 110 pressurizes fluid that is supplied to the apparatus 100. Pressure regulating valve 111 may be adjustable by twisting an outer cover portion of the valve 111 to control, and limit, the pressurized fluid discharged from the pump 110.

Spray gun 114 may be, but is not limited to, an aluminum lance type system, known to those having ordinary skill in the art, that permits fluid to pass through the device from the handle towards the end of the spray gun 114, the end of the spray gun 114 being located in FIG. 1, resting in the gun terminal holder 118. Spray gun 114 may include parts, such as but not limited to, those available from Giant Industries, Inc., of Toledo, Ohio, and identified by Part No. 21290C. Gun terminal holder 118 may be constructed from materials such as, but not limited to, steel, rubber, and plastic. Gun terminal holder may be formed to conform to the shape of the end of the spray gun 114, and may be secured to the deck housing 102, to keep the spray gun 114 secure when it is not in use. Splash guard 120 may prevent fluid expelled from the rotary nozzle system 116, and debris dislodged from the flat surface, from striking a user of the apparatus 100. The PRV to diversion block fluid line 122 may run from the pressure regulating valve 111 to the diversion system 112. Diversion block to rotary nozzle system fluid line 124 may run from the diversion system 112 to the rotating union 604 (see FIG. 6) of the rotary nozzle system 116.

Figure 2:
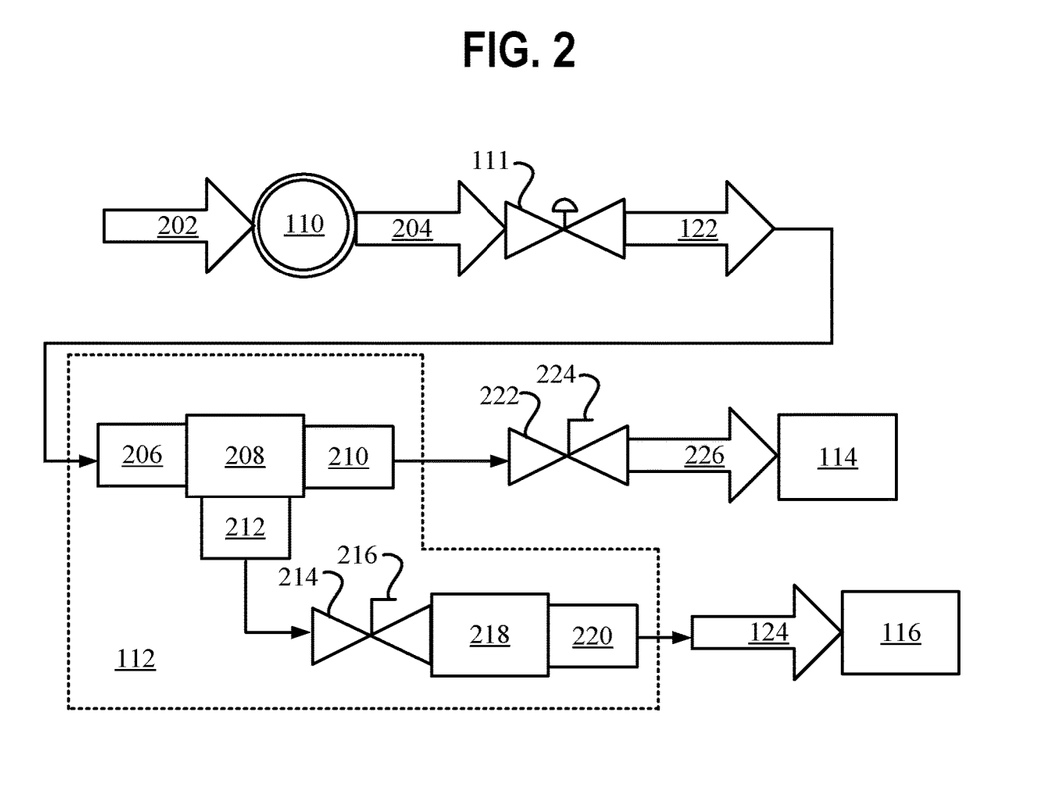
FIG. 2 is fluid flow diagram that may apply to the pressure washing apparatus of FIG. 1.

FIG. 2 shows a fluid flow diagram 200 that may apply to the pressure washing apparatus 100 of FIG. 1. Fluid flow diagram 200 includes a fluid supply line 202, the pump 110, a pump to PRV line 204, the pressure regulating valve 111, the PRV to diversion block fluid line 122, a connector 206, a diversion block 208, an elbow connector 210, the diversion block to rotary nozzle system fluid line 124, the rotary nozzle system 116, a reducer 212, a valve 214, a valve trigger 216, a trigger base, 218, a connector 220, a shut off valve 222, a valve handle 224, a fluid line 226, and the spray gun 114. The portions of FIG. 2 shown inside the dotted line may be included in the diversion system 112.

Figure 9:
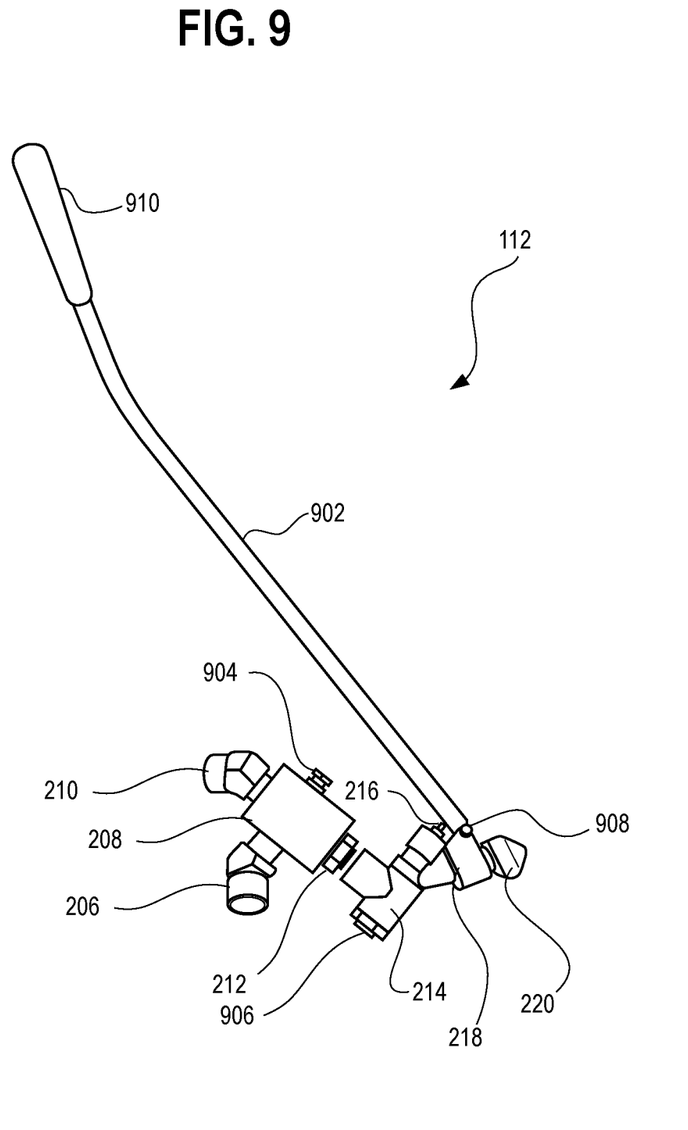
FIG. 9 is an isolated view of the diversion system of FIG. 1.

Fluid supply line 202 may supply fluid, such as, but not limited to, water and a water cleaning solution mixture, to pump 110. Connector 206 and connector 210 may be, but are not limited to, the elbow type connectors 206 and 210 shown in FIG. 9. For example, connector 206 may be a 45 degree street elbow ⅜ inch that may be formed from materials such as, but not limited to, stainless steel, aluminum, and plastic. Diversion block 208 may be, but is not limited to, the metallic type block shown in FIG. 9, in which the three ports shown are joined (internal connection not shown) in the diversion block 208, and the three ports may be threaded. Reducer 212 may be, but is not limited to the reducer 212 shown in FIG. 9, in which the reducer 212 is a ⅜ inch×¼ inch reducing nipple. Valve 214 may be, but is not limited to, valve 214 of FIG. 9, in which the valve 214 is a brass hollowed body that includes a valve seat (not shown) such as that available from Giant Industries, Inc., and identified by Part No. 21007LA, that may be secured with a valve cap, such as the valve cap 906 (see FIG. 9). Trigger base 218 may be formed to permit fluid passage through itself while forming a cradle for a valve handle 902, such as shown in FIG. 9, in order to permit the valve handle 902 to depress the valve trigger 216. The trigger base 218 may include one or more holes to permit a fastener, such as trigger pin 908 (see FIG. 9) to retain the valve handle 902 in a location that enables it to depress the valve trigger 216. Connector 220 may be a connector such as, but not limited to, the type shown in FIG. 9, in which connector 220 is a 45 degree street elbow ¼ inch to ¼ inch that may be formed from materials such as, but not limited to, brass, stainless steel, aluminum. Shut off valve 222 may be, but is not limited to, a two-way valve having a handle 224 that allows fluid to be cut-off from the spray gun 114. Fluid line 226 may provide a removable fluid path from the diversion system 112 to the spray gun 114. Fluid line 226 may include a quick disconnect feature known to those having skill in the art.

Figure 3:
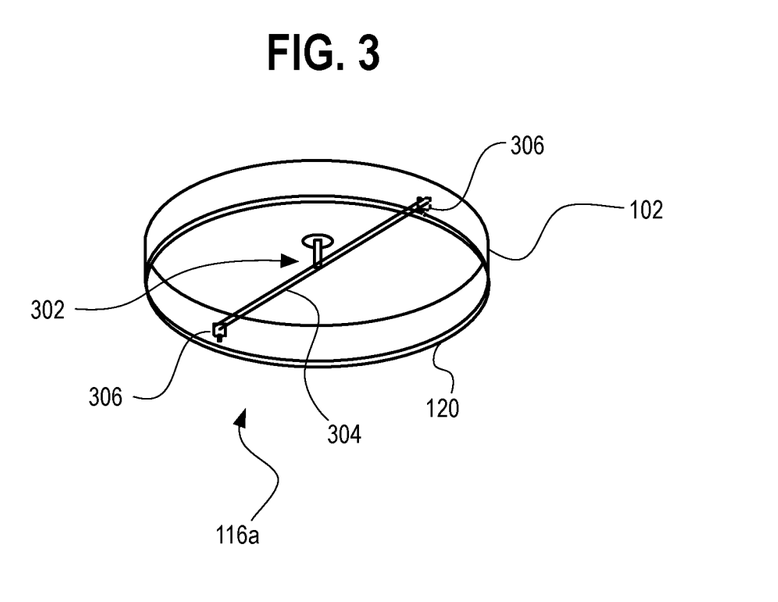
FIG. 3 is a view of the underside of the deck housing of FIG. 1 that includes portions of the rotary nozzle system of FIG. 1.

FIG. 3 shows a view of the underside of deck housing 102 and a bottom portion 116a of the rotary nozzle system 116. The rotary nozzle system 116 may include a swivel fasteners 302, a spray bar 304, and one or more spray nozzles 306. Swivel fasteners 302 may be, but are not limited to, four hex nuts that may secure the rotary nozzle system 116 to the deck 102. Spray bar 304 may be, but is not limited to, a tubular extension that may be threaded and may be formed from materials such as, but not limited to steel, stainless steel, and aluminum, that may be attached to the rotating union 604 (see FIG. 6). One or more spray nozzles 306 may be placed on the end(s) of the spray bar 304 and may be mounted at 45 degrees from vertical in order to cause the spray bar 304 to rotate when fluid is passed through the spray bar 304. The discharge from the spray nozzles 306 may also clean the flat surface under the apparatus 100. Spray nozzles 306 may be formed from materials that include, but are not limited to, stainless steel.

Figure 4:
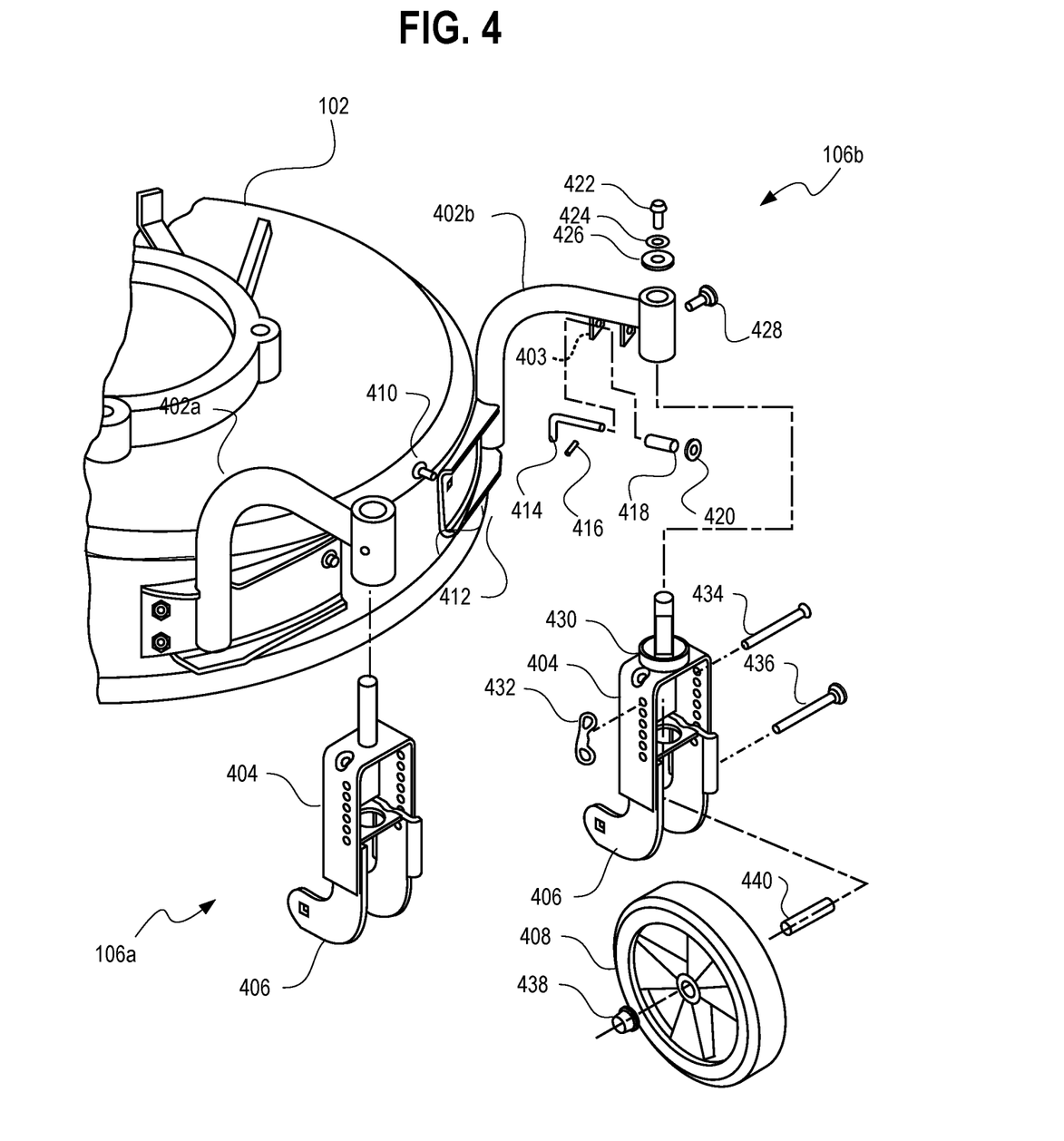
FIG. 4 is an exploded view of the right and left front wheel mechanisms of FIG. 1.

FIG. 4 shows an exploded view of the right front wheel mechanism 106a and the left front wheel mechanism 106b. The right front wheel mechanism 106a may include a right arm caster 402a. The left front wheel mechanism 106b may include a left arm caster 402b. The wheel mechanisms 106a and 106b may also include an outer yoke 404, an inner yoke 406, a wheel 408, a plurality of caster mounting bolts 410, a plurality of lock nuts 412, a retaining pin 414, a pull pin 416, a compression spring 418, a washer 420, a fastener 422, a lock washer 424, a washer 426, a grease fitting 428, a retaining ring 430, a locking cotter 432, a box tie 434, an axle bolt 436, an axle lock nut 438, and an axle sleeve 440.

Wheel mechanisms 106a and 106b allow for cleaning edges of the surface, while allowing the pressure washing apparatus 100 to remain level on the surface. Right arm caster 402a and left arm caster 402b may be formed from materials that include powder coated steel and may be secured to the deck 102 with fasteners such as, but not limited to, caster mounting bolts 410 and lock nuts 412. Outer yokes 404, may be stainless steel housing with an internally threaded weldment shaft attaches to arm casters 402a and 402b using fastener components such as, but not limited to fastener 422, lock washer 424 and washer 426. Outer yoke 404 may slide over a portion of inner yoke 406 to provide an adjustable height for right front wheel mechanism 106a and left front wheel mechanism 106b. The box tie 434 and locking cotter 71 may be formed from material such as, but not limited to, steel, aluminum and brass. Wheel 408 may be, but is not limited to an 8 inch diameter no-flat wheel and may be formed from rubber to reduce vibration. Pull pin 416 may insert into caster guide 403 and may provide a locking/retaining mechanism through a quarter turn of the retaining pin after insertion into the caster guide 403. Retaining pin 414 may be a mechanical tension pin that expands into the pull pin 416. Compression spring 418 may provide tension for locking/retaining mechanism in conjunction with the retaining pin 414, pull pin 416, and washer 420. The retaining pin 414, pull pin 416, compression spring 418 and washer 420 may be used on both wheel mechanisms 106a and 106b, or on only one of the wheel mechanisms 106a and 106b. The retaining ring 430 may be a circular metal piece that holds the retaining pin 414 in place. The axle bolt 436 may be, but is not limited to, a 5/16 inch by 2¾ inch round head square neck bolt that provides axle support for wheel 408, which may be secured by lock nut 438.

Figure 5A:
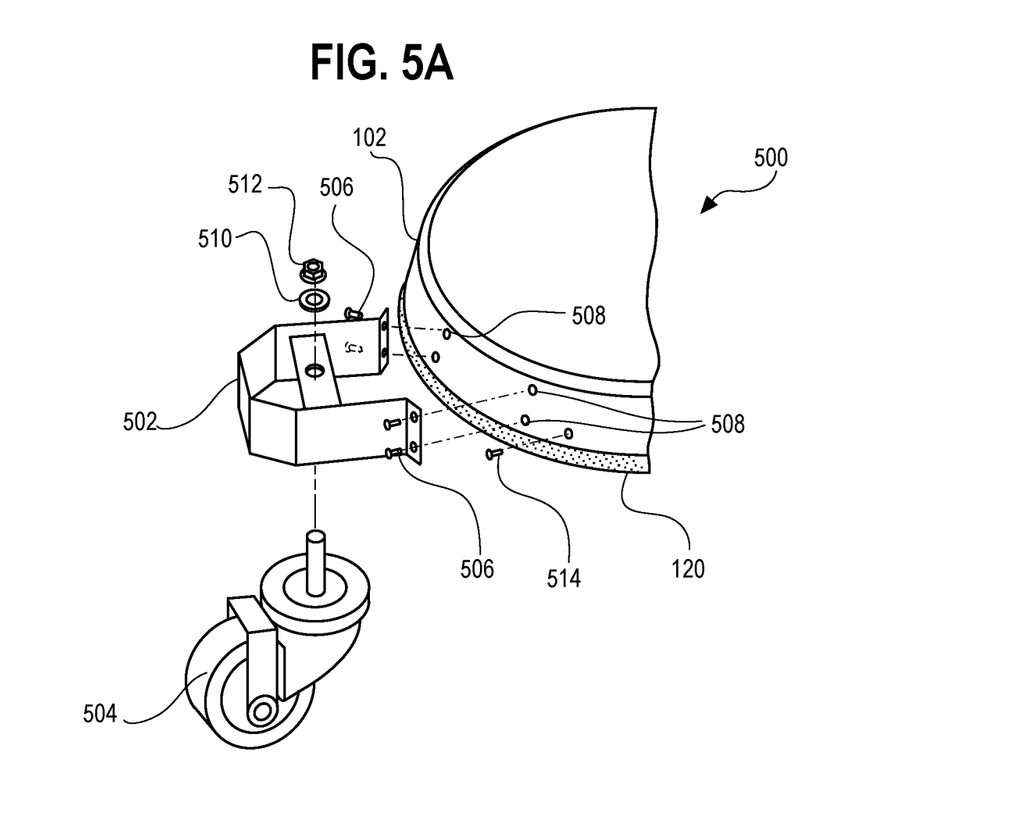
FIG. 5A is an exploded view of an alternative front wheel mechanism that may be used with the pressure washing apparatus of FIG. 1.

FIG. 5A is an exploded view of an alternative front wheel mechanism 500 that may be used with the pressure washing apparatus 100. The alternative front wheel mechanism 500 may include a center wheel bracket 502, and a caster wheel 504. The center wheel bracket may be secured to the deck housing 102 with a plurality of fasteners 506, using a plurality of holes 508, a plurality of washers 510, and a plurality of nuts 512. FIG. 5A also shows that splash guard 102 may be secured to deck housing 102 using a plurality of fasteners 514.

Figure 5B:
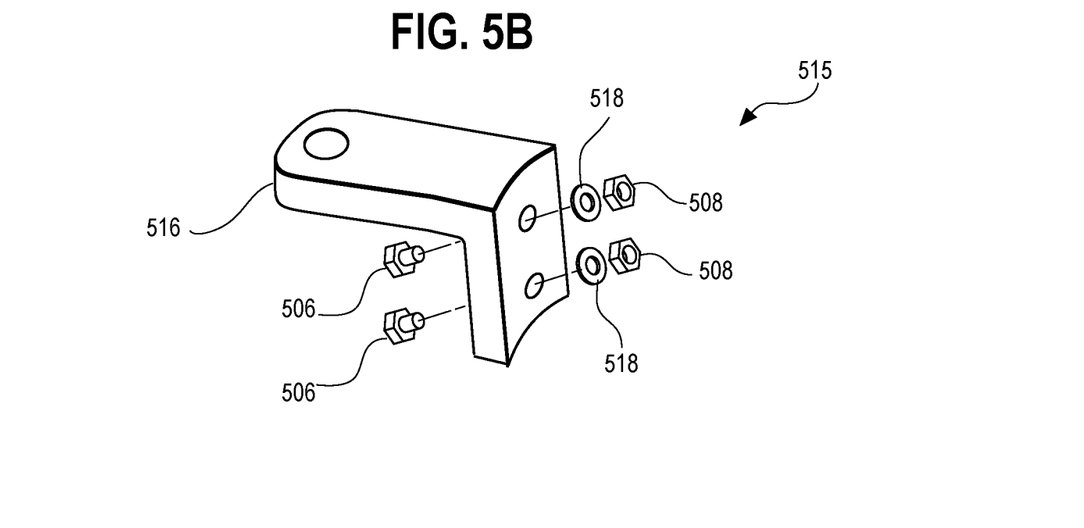
FIG. 5B is an exploded view of an additional alternative front wheel mechanism that may be used with the pressure washing apparatus of FIG. 1.

FIG. 5B is an exploded view of an additional alternative front wheel mechanism 515 that may be used with the pressure washing apparatus of FIG. 1. Additional alternative front wheel mechanism 515 may include a center wheel mount 516 that may be secured to deck housing 102 using one or more center fasteners 506, one or more holes 508, and one or more washers 518.

Figure 6:
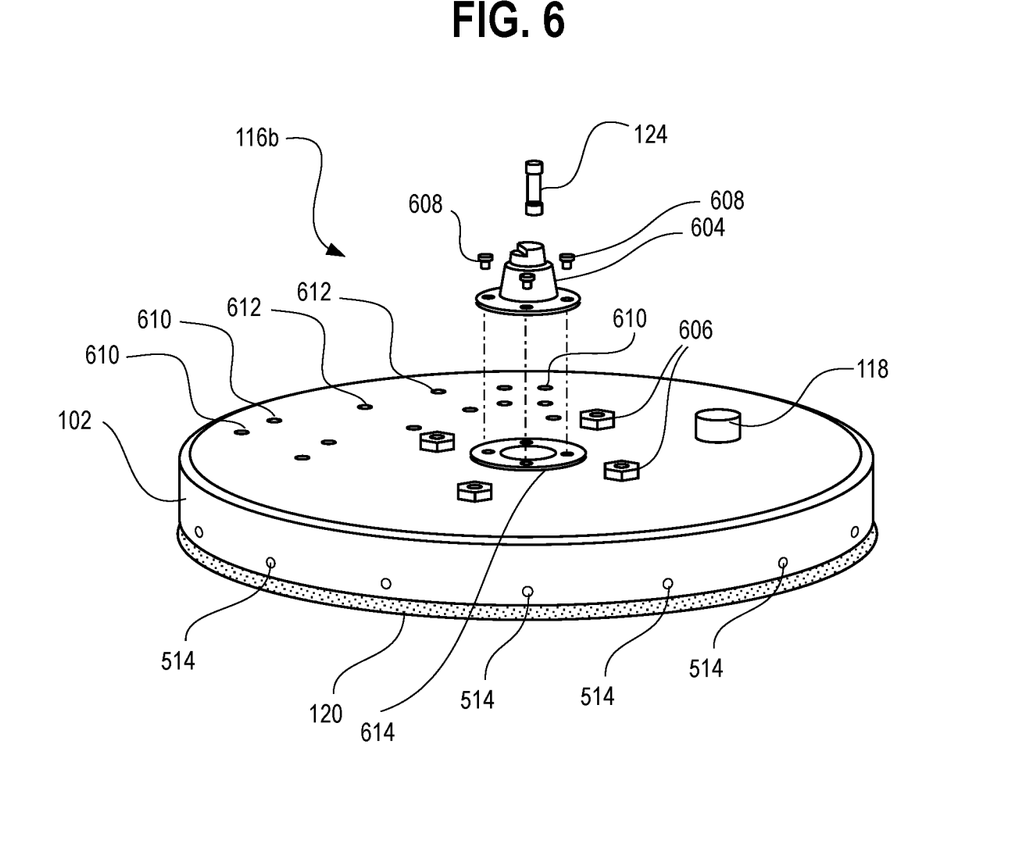
FIG. 6 is an exploded view of the deck housing of FIG. 1 and portions of the rotary nozzle system of FIG. 1.

FIG. 6 is an exploded view of the deck housing 102 and a top portion 116b of the rotary nozzle system 116 that may be connected to the diversion block to rotary nozzle fluid line 124. The top portion 116b may include a rotating union 604 secured to the deck housing 102 using a plurality of lock nuts 606, a plurality of bolts 608, a plurality of holes 610, and a mounting plate 614. Also shown in FIG. 6 is a plurality of holes 610 that may be used to mount the handle 108 and a plurality of holes 612 that may be used to mount the power source 104.

Figure 7:
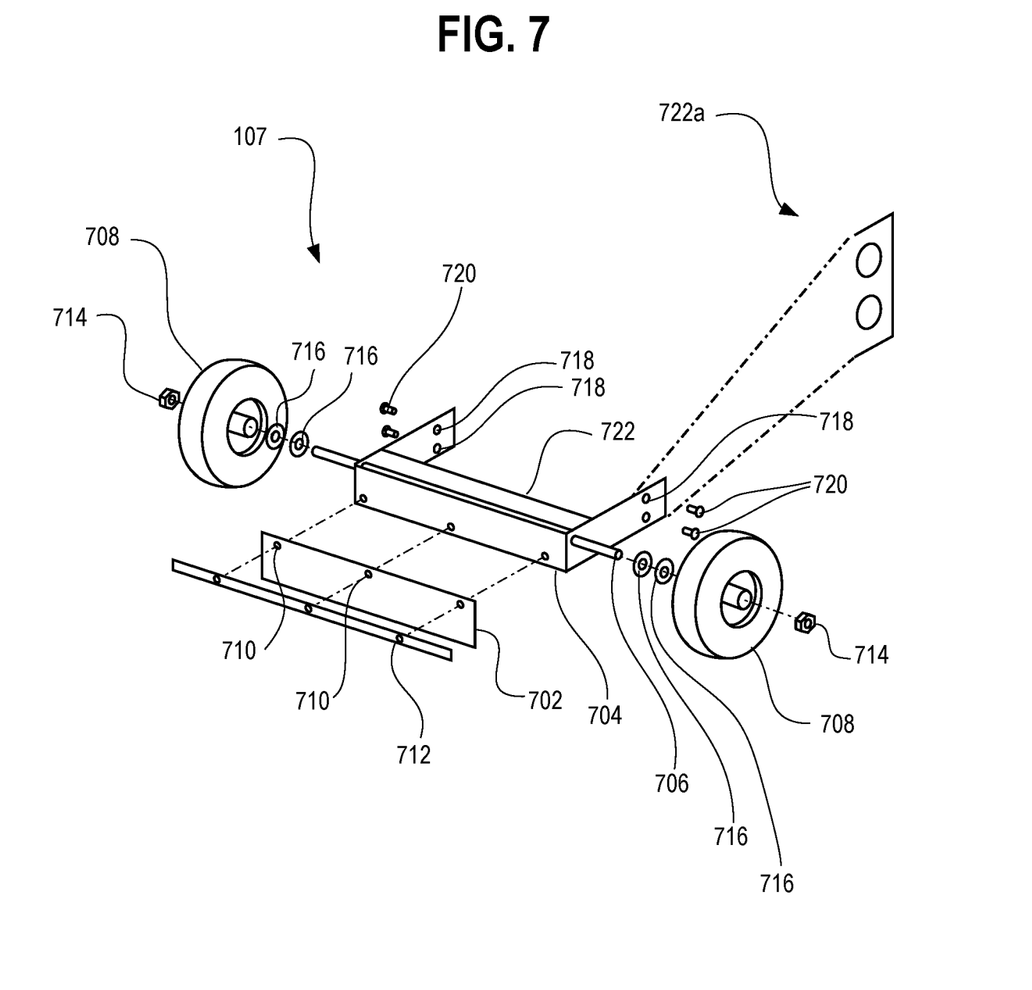
FIG. 7 is an exploded view of the rear wheel mechanism of FIG. 1.

FIG. 7 is an exploded view of the rear wheel mechanism 107. Rear wheel mechanism 107 may include a splash guard 702, a wheel housing 704, an axle 706, a one or more rear wheels 708. The splash guard 702 may be secured to the wheel housing 704 using a plurality of fasteners 710. A guard strip 712 may be secured to the splash guard 702. The wheels 708 may be secured to the axle 709 using one or more hex nuts 714, and one or more washers 716. The wheel housing may be adjustably secured to the deck housing 102 using one or more lock nuts 718 and one or more cap screws 720, such that a height adjustment bracket 722, shown in greater detail as 722a, with oblong holes, may allow for the height of the rear of the housing deck 102 to be adjusted. Cap screws 720 may be, but are not limited to inch by 1.5 inches, and lock nuts 718 may be, but are not limited to, ¼ inch stainless steel. Fasteners 710 may be, but are not limited to pop rivets. Rear wheel mechanism 107 may be height adjustable and may be powder coated steel.

Figure 8:
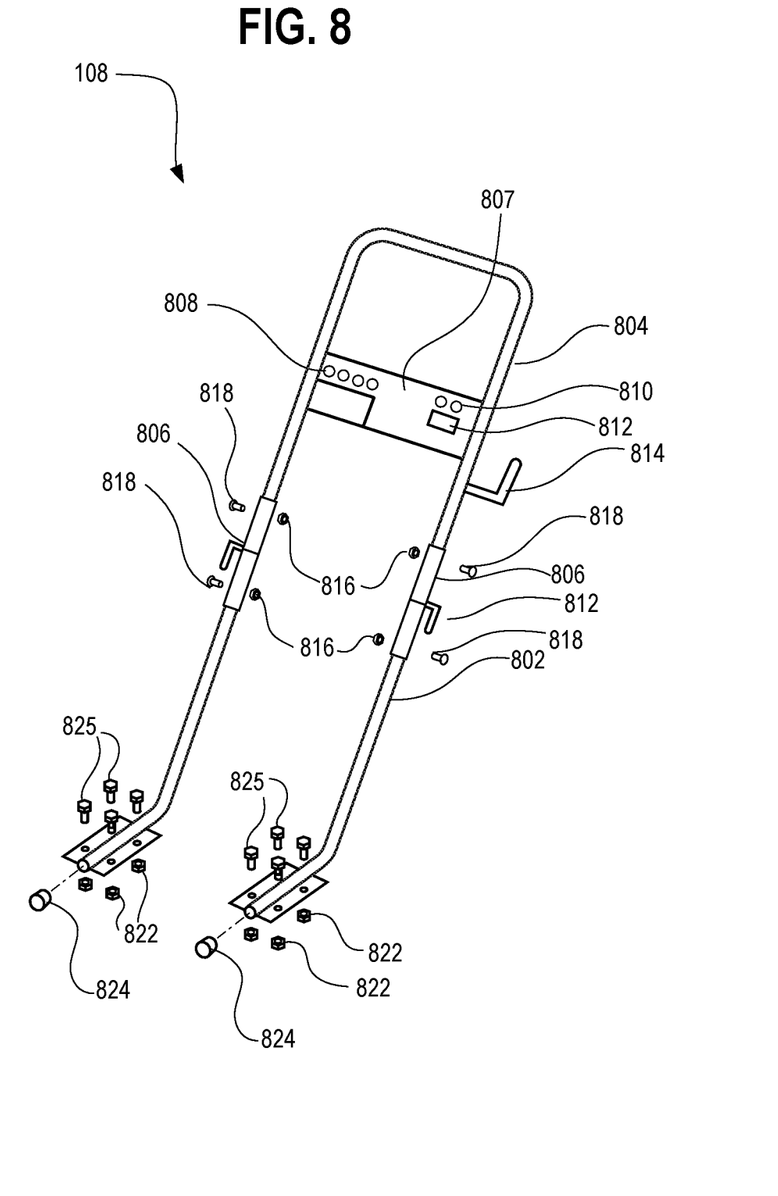
FIG. 8 is an isolated view of the handle of FIG. 1.

FIG. 8 is an isolated view of the handle 108. Handle 108 may include a lower portion 802 and an upper portion 804, that are collapsibly attached by a pair of hinges 806. Upper portion 804 may include a mounting plate 807, and a plurality of spray tip holders 808 for spray tips (not shown) for spray gun 114. Upper portion 804 may also include s socket cap and bolt(s) 810, a diversion arm stop 812, and a holster 814. The hinges 806 may be secured to the upper portion 804 and lower portion 802 using fasteners 816 and 818. The lower portion 802 may be secured to the deck housing 102 using lock nuts 822 and handle mounting bolts 820. A pair of tube caps 824 may be secured to an opening in the lower portion 802. The socket cap and bolts(s) 810 may be used to secure the diversion system 112 to the upper portion of the handle 804. Diversion arm stop 812 prevents the valve handle 902 from falling too far forward when the valve arm 902 is pushed away from the operator in order to permit the fluid to flow to the rotary nozzle system 116. Holster 814 secures the spray gun 114 when it is not in use.

FIG. 9 is an isolated view of the diversion system 112. The diversion system may include the connector 206, the diversion block 208, the elbow connector 210, the reducer 212, the valve 214, the valve trigger 216, the trigger base 218, the connector 220, a valve handle 902, a socket cap 904, a cap 906, a trigger pin 908, and a grip 910. The valve handle 902 may be pushed forward by the operator, forward being towards the engine and away from the upper portion 804 of the handle 108, in order to engage the valve trigger 216, which allows the fluid to flow from the diversion block 208 to the connector 220, and then to the spray gun 114. Although shown as a bar bent at approximately 90 degrees, valve handle 902 may also be employed as a foot pedal or a handle bar, as long as complementary parts are provided in order to allow for the activation of valve trigger 216 with the movement of valve handle 902. Cap 906 may secure the internal components (not shown) of the valve 214. Trigger pin 908 pivotally secures the valve handle 902 to the valve 214.

Although FIG. 9 shows various exemplar components of the diversion system 112, those skilled in the art will recognize that other forms of the components may serve the various functions contemplated by the components shown in FIG. 9, and the flow diagram 200 of FIG. 2.

Figure 10:
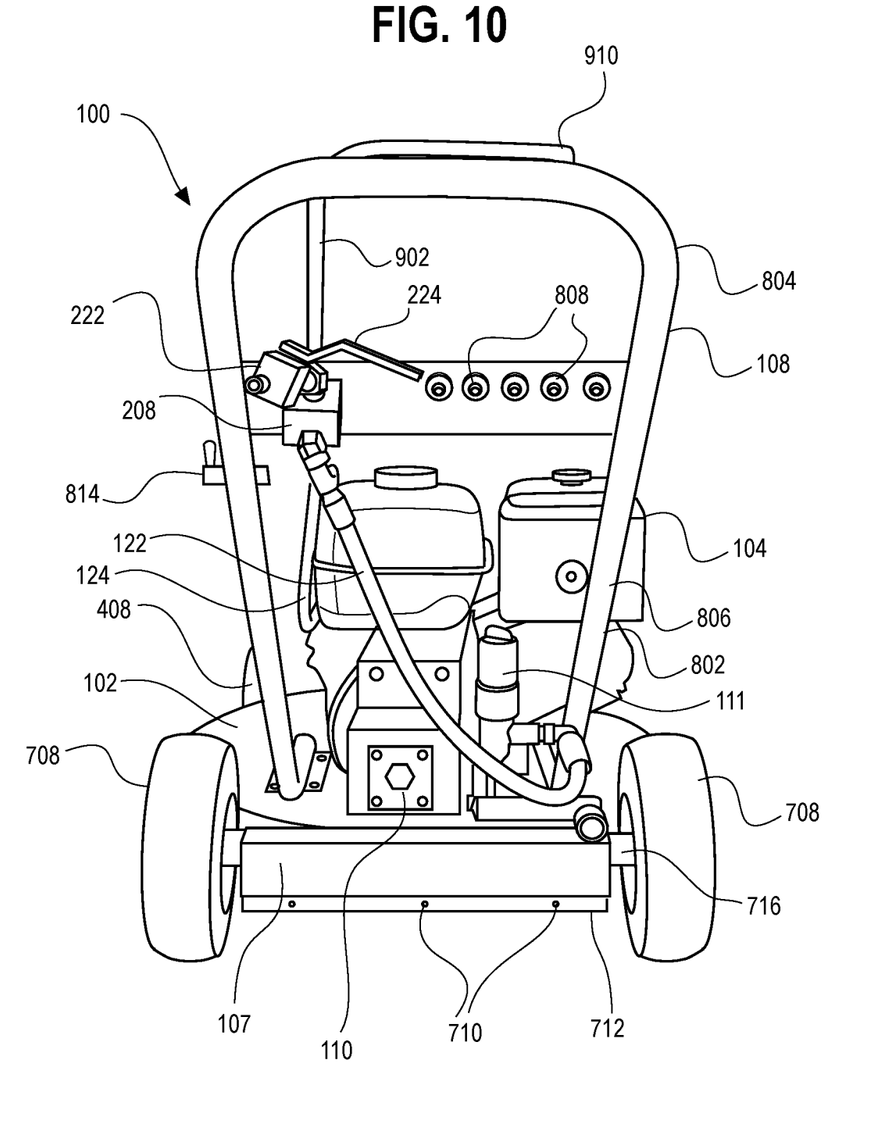
FIG. 10 is a rear view of the pressure washing apparatus of FIG. 1.

FIG. 10 shows a rear view of the pressure washing apparatus 100. FIG. 10 provides an additional view of the deck housing 102, the power source 104, the rear wheel mechanism 107, the handle 108, the pump 110, the pressure regulating valve 11l, the PRV to diversion block fluid line 122, the diversion block to rotary nozzle system fluid line 124, the diversion block 208, the shut off valve 222, the valve handle 224, the wheel 408, the rear wheels 708, the fasteners 710, the guard strip 712, the washers 716, the lower handle portion 802, the upper handle portion 804, the hinges 806, the spray tip holders 808, the valve handle 902, and the grip 910.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the appended claims.

The above description of the disclosed embodiments is provided to enable any person skilled in the art to make or use that which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings. All such modifications and variations are intended to be included herein within the scope of this disclosure and protected by the following claims.

What is claimed is:

1. A pressure washer system having a handle for pushing the system, comprising:
    a pump;
    a pressure regulating valve;
    a diversion block, where the pump provides a fluid to the diversion block;
    a spray gun;
    a first fluid path, where the first fluid path includes the pump, the pressure regulating valve, the diversion block, and the spray gun;
    a fluid valve;
    a valve handle positioned to actuate a valve trigger, the valve trigger being depressible into the fluid valve;
    a trigger base that pivotally secures the valve handle to position the valve trigger to actuate the fluid valve when the valve handle pivots about the trigger base, such that the fluid valve may be actuated by pulling a horizontal portion of the valve handle toward a horizontal portion of a system handle connected to a deck housing for pushing the system without an operator's hands moving from the system handle; and
    a rotary nozzle system, where the actuation of the fluid valve creates a second fluid path, where the second fluid path includes the pump, the pressure regulating valve, the diversion block, the fluid valve and the rotary nozzle system, and wherein the rotary nozzle system includes one or more rotating spray nozzles when the second fluid path is open,
    wherein the second fluid path is blocked when the fluid valve is not actuated.

2. The pressure washer system of claim 1, where the fluid pressure available to the first fluid path is reduced when the fluid valve is actuated.

3. A method of washing flat surfaces and surfaces adjacent to the flat surface, the method including the steps of:
    cleaning a first surface that is not underneath a pressure washer system through a first fluid path actuated by a valve handle positioned external to a fluid valve, where the first fluid path includes a pump, a pressure regulating valve, a diversion block, and a spray gun, while spray nozzles are not discharging fluid to a second surface;
    actuating the fluid valve connected to the diversion block, thereby reducing the pressure available to the first fluid path and creating a second fluid path, where the second fluid path includes the pump, the pressure regulating valve, the diversion block and the spray nozzles, where the spray nozzles are configured to rotate above the second surface when the second fluid path is open, and the second fluid path may be actuated without the operator's hands moving from a system handle connected to a deck housing, by pulling a grip toward a horizontal portion of the system handle for pushing the system, thus depressing a valve trigger into the fluid valve; and
    cleaning the second surface underneath the pressure washer system through the second fluid path.

* * * * *